(12) United States Patent
Sung et al.

(10) Patent No.: US 7,743,664 B2
(45) Date of Patent: Jun. 29, 2010

(54) TRANSISTOR-TYPE PRESSURE SENSOR AND METHOD FOR FABRICATING THE SAME

(75) Inventors: Chao-Feng Sung, Miaoli County (TW);
Chih-Wei Chu, Taipei (TW);
Yuh-Zheng Lee, Hsinchu (TW);
Chao-Kai Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 16 days.

(21) Appl. No.: 12/189,205

(22) Filed: Aug. 11, 2008

(65) Prior Publication Data

US 2009/0199648 A1    Aug. 13, 2009

(30) Foreign Application Priority Data

Feb. 13, 2008    (TW) ............... 97105029 A

(51) Int. Cl.
*G01L 7/00*    (2006.01)

(52) U.S. Cl. ................. 73/756; 73/754; 438/459

(58) Field of Classification Search ....... None
See application file for complete search history.

(56) References Cited

U.S. PATENT DOCUMENTS

| | | | | |
|---|---|---|---|---|
| 5,396,118 | A | * | 3/1995 | Yaguchi ............. 327/516 |
| 6,137,120 | A | * | 10/2000 | Shindo et al. ............. 257/66 |
| 6,177,706 | B1 | * | 1/2001 | Shindo et al. ............. 257/347 |
| 6,880,406 | B2 | | 4/2005 | Yang |
| 2004/0237661 | A1 | * | 12/2004 | Yang ............. 73/754 |
| 2006/0205013 | A1 | | 9/2006 | Shim et al. |

* cited by examiner

*Primary Examiner*—Andre J. Allen
(74) *Attorney, Agent, or Firm*—Jianq Chyun IP Office

(57) ABSTRACT

A transistor-type pressure sensor is provided, having an upper and a lower substrates, a source/drain formed on the lower substrate and separated from each other, a channel layer formed between and on the source/drain, a dielectric layer and a gate. The gate is substantially formed between the source and the drain. The surface of the gate, being in contact with the dielectric layer, has a stepped surface profile, so that the channel length/width ratio can be changed due to the pressure sensed by the pressure sensor.

28 Claims, 10 Drawing Sheets

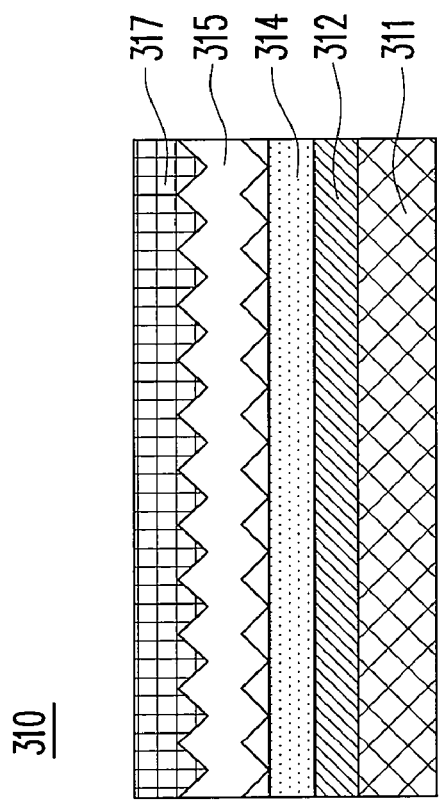
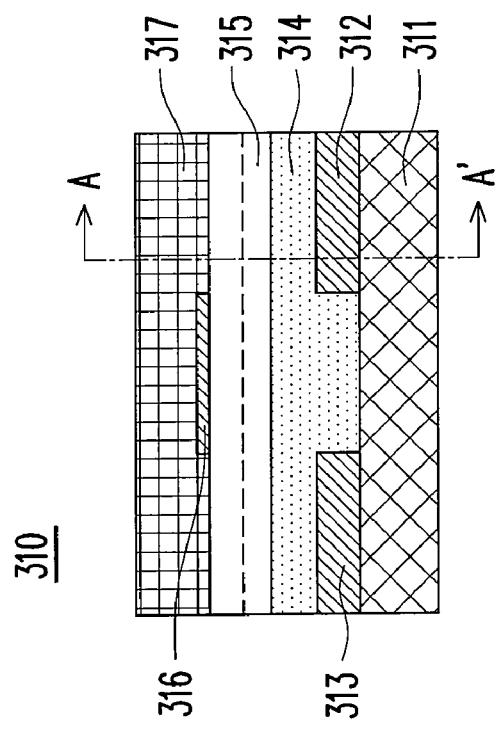
FIG. 4B
FIG. 4A

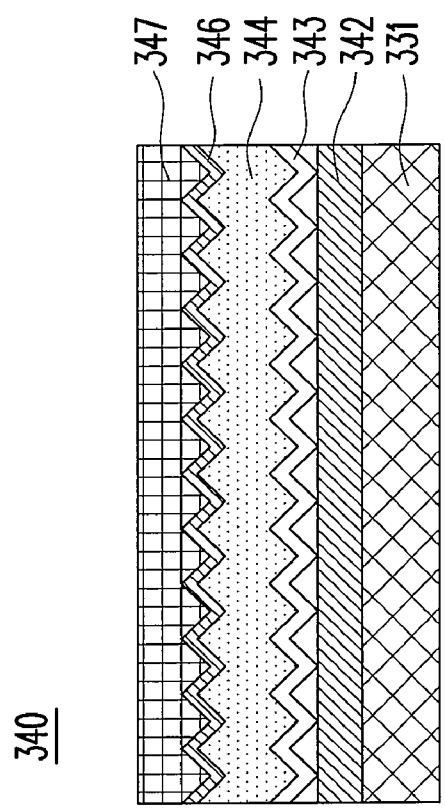
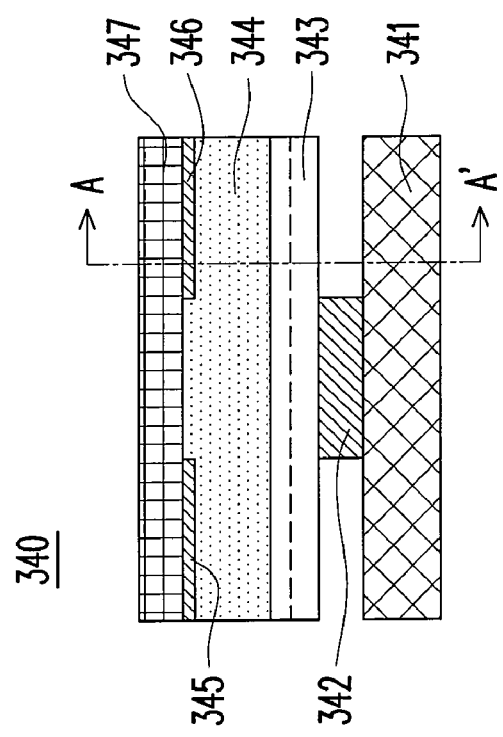
FIG. 7B
FIG. 7A

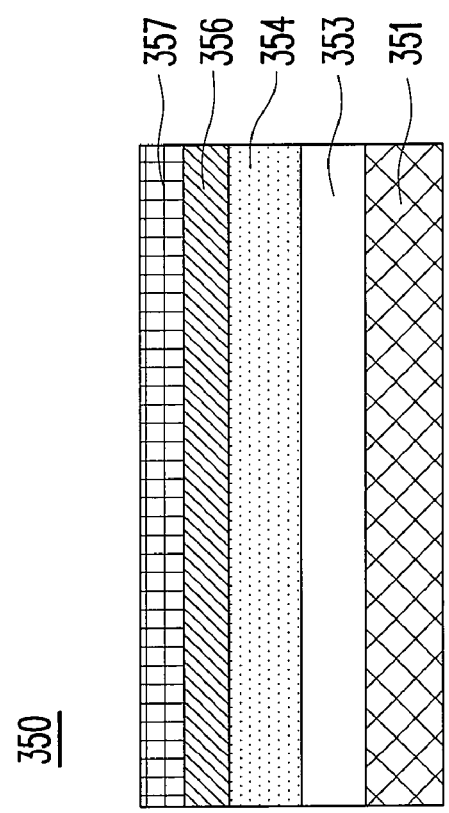
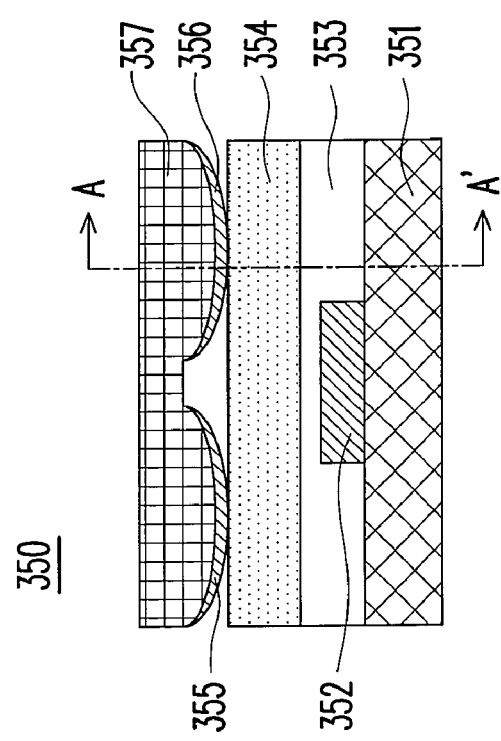
FIG. 8A
FIG. 8B

TRANSISTOR-TYPE PRESSURE SENSOR AND METHOD FOR FABRICATING THE SAME

CROSS-REFERENCE TO RELATED APPLICATION

This application claims the priority benefit of Taiwan application serial no. 97105029, filed on Feb. 13, 2008. The entirety of the above-mentioned patent application is hereby incorporated by reference herein and made a part of this specification.

BACKGROUND OF THE INVENTION

1. Field of the Invention

The present invention relates to a transistor-type pressure sensor structure. More particularly, the present invention relates to a transistor-type pressure sensor structure having a soft and flexible electrode with a stepped surface profile, and a fabrication method thereof.

2. Description of Related Art

Pressure measurements, such as atmospheric pressure or hydraulic pressure measurement, are an important part for industrial control. Generally, principles and methods of the pressure measurement are diversified, and different design methods can be applied to different fields or requirements. The current design methods for a pressure sensor include resistor type, voltage type, capacitor type, potentiometer type, inductance bridge type, strain gauge type and semiconductor pressure sensor etc.

Due to great reduction of sizes of the pressure sensors, and restrictions of fabrication processes, assembling and operations thereof, a new micro-processing technology referred to as a micro electro-mechanical system (MEMS) is developed. The MEMS has advantages of miniaturization, batch production, etc, and therefore it has been applied to other types of the pressure sensors. However, as to most of the conventional pressure sensor structures, an additional transistor is still required for receiving an output signal of the pressure sensor.

In the conventional pressure sensors, U.S. Pat. No. 6,880,406 discloses a semiconductor pressure sensor, in which a capacitor-type pressure sensor is fabricated based on a MEMS fabrication process to coordination with a control circuit (such as a complementary metal-oxide-semiconductor (CMOS) control circuit) for receiving and processing an output signal of a plate capacitor. However, according to this patent, a pressure-sensing function is not directly integrated with a field effect transistor.

Moreover, U.S Application no. 20060205013 discloses a biosensor using the field effect transistor, in which a ligand is combined to a surface of the gate of the field effect transistor, and the ligand can be connected to an end of a nucleic acid for increasing a Debye length. The ligand is selectively combined to a side of the nucleic acid for attaching the nucleic acid on the gate surface. Under such circumstances, the nucleic acid is parallelly attached to the gate surface, and is not perpendicular to the gate surface, so as to generate an effective depletion region.

SUMMARY OF THE INVENTION

The present invention is related to a semiconductor pressure sensor structure, which has electrodes with stepped surface profiles being integrated with a transistor structure. The electrodes with the stepped surface profiles can be deformed under a pressure applied to on a device surface, so that a channel area of the transistor is changed. Therefore, a current value of the device is changed for sensing a variation of the pressure, so as to form the transistor-type pressure sensor.

The present invention provides a transistor-type pressure sensor having an upper substrate, a lower substrate and a transistor structure. The transistor structure has at least a gate, a source and a drain, and is formed between the lower and the upper substrates. A thin-film whose at least one layer including the gate, or the source and the drain has a stepped surface profile, and the stepped surface profile is capable of being deformed under a pressure applied to the pressure sensor, so as to change a width/length ratio of the channel layer.

The present invention further provides a method for fabricating a transistor-type pressure sensor, in which the transistor comprises a gate, a source/drain, and a dielectric layer and a channel layer sequentially located between the gate and the source/drain. The method for fabricating the transistor-type pressure sensor comprises the following steps. An upper substrate and a lower substrate are provided. Then, the transistor is formed between the upper and the lower substrates, in which the gate, or the source and the drain are formed with a stepped surface profile.

In order to make the aforementioned and other objects, features and advantages of the present invention comprehensible, a preferred embodiment accompanied with figures is described in detail below.

BRIEF DESCRIPTION OF THE DRAWINGS

FIGS. 1A and 1B are structural diagrams of a transistor-type pressure sensor according to an embodiment of the present invention, wherein FIG. 1B is a cross-sectional view of the transistor-type pressure sensor along a section line A-A' of FIG. 1A.

FIGS. 3A and 3B are structural diagrams illustrating a transistor-type pressure sensor according to another embodiment of the present invention, wherein FIG. 3B is a cross-sectional view of the transistor-type pressure sensor along a section line A-A' of FIG. 3A.

FIGS. 4A and 4B are structural diagrams illustrating a transistor-type pressure sensor according to another embodiment of the present invention, wherein FIG. 4B is a cross-sectional view of the transistor-type pressure sensor along a section line A-A' of FIG. 4A.

FIGS. 5A and 5B are structural diagrams illustrating a transistor-type pressure sensor according to another embodiment of the present invention, wherein FIG. 5B is a cross-sectional view of the transistor-type pressure sensor along a section line A-A' of FIG. 5A.

FIGS. 6A and 6B are structural diagrams illustrating a transistor-type pressure sensor according to another embodiment of the present invention, wherein FIG. 6B is a cross-sectional view of the transistor-type pressure sensor along a section line A-A' of FIG. 6A.

FIGS. 7A and 7B are structural diagrams illustrating a transistor-type pressure sensor according to another embodiment of the present invention, wherein FIG. 7B is a cross-sectional view of the transistor-type pressure sensor along a section line A-A' of FIG. 7A.

FIGS. 8A and 8B are structural diagrams illustrating a transistor-type pressure sensor according to another embodiment of the present invention, wherein FIG. 8B is a cross-sectional view of the transistor-type pressure sensor along a section line A-A' of FIG. 8A.

DESCRIPTION OF EMBODIMENTS

The present invention relates to a transistor-type pressure sensor having electrodes with stepped surface profiles. For example, the transistor-type pressure sensor can utilize a field effect transistor to realize.

Figure 1A:
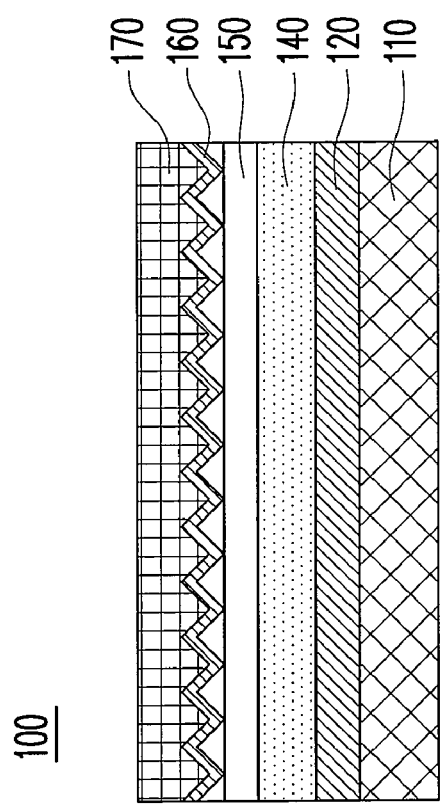
Figure 1B:
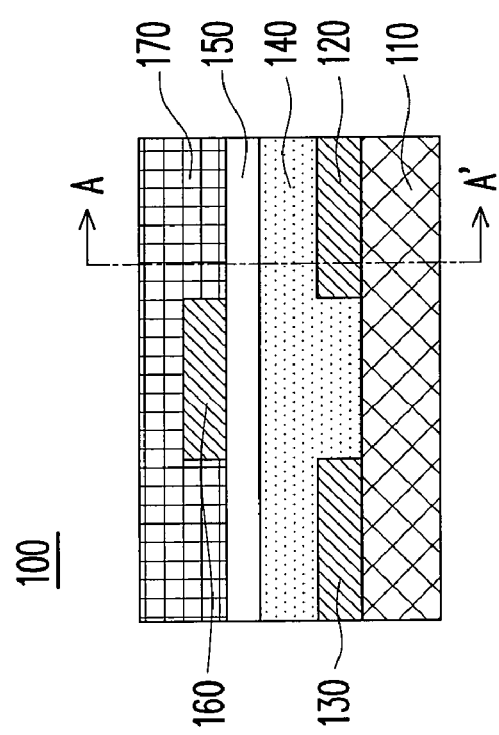

FIG. 1A and FIG. 1B are structural diagrams of a transistor-type pressure sensor according to an embodiment of the present invention, in which FIG. 1B is a cross-sectional view of the transistor-type pressure sensor along a section line A-A' in FIG. 1A. As shown in FIG. 1A and FIG. 1B, the pressure sensor 100 comprises a lower substrate 110, a source 120 and a drain 130 both formed on the lower substrate 110 and located apart from each other, a semiconductor channel layer 140 expanding between the source 120 and the drain 130, a dielectric layer 150 disposed on the source 120/drain 130 and the semiconductor channel layer 140, and a gate 160 with a stepped surface profile formed on a soft and flexible upper substrate 170. Then, the upper substrate 170 having the gate 160 with the stepped surface profile (a serrated profile of the gate 160 shown in FIG. 1B) is combined to the dielectric layer 150 located on the lower substrate to form the transistor-type pressure sensor.

The gate 160 on the upper substrate 170 is substantially corresponding to a position located between the source 120 and the drain 130. Since the gate 160 has the stepped surface profile, the surface profile is deformed and a contact area between the gate 160 and the dielectric layer 150 is varied accordingly when the transistor functioned as the pressure sensor is subject to an external pressure. Variation of the contact area leads to a change of a channel length/width ratio of the channel layer of the transistor. Therefore, when the transistor is turned on, an output current thereof is varied. Namely, a characteristic curve of output current of the transistor is varied. Since deformation degree of the gate is proportional to the applied pressure, the pressure can be measured according to the variation of the output current, so as to form a pressure-sensitive pressure sensor device.

FIGS. 2A to 2F are schematic diagrams illustrating a plurality of gate structures with stepped surface profiles, which can be respectively formed as the gate structure 160 on the upper substrate 170. Basically, the stepped surface profile can be arranged into a one-dimensional or two-dimensional array structure based on a plurality of unit patterns, so that the contact area between the gate and the dielectric layer can be changed according to the applied pressure.

Figure 2A:
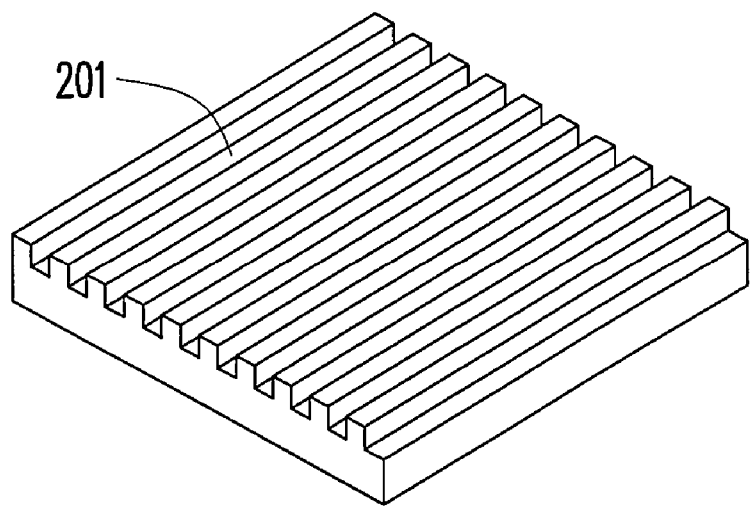
FIGS. 2A~2F are schematic diagrams respectively illustrating a plurality of gate structures with stepped surface profiles.
Figure 2B:
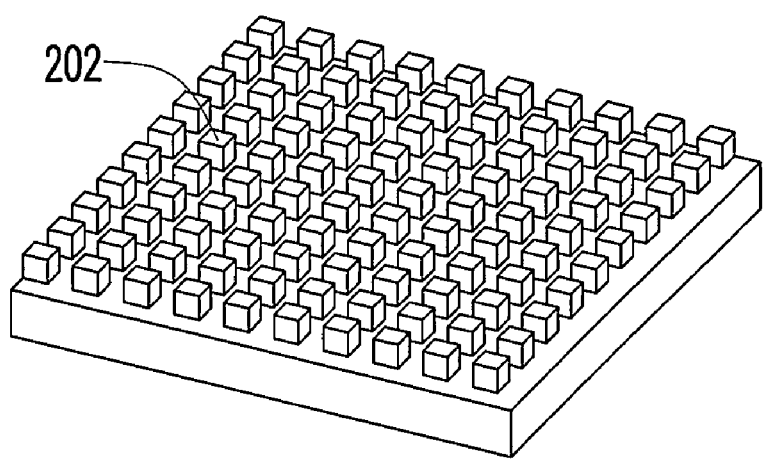
Figure 2C:
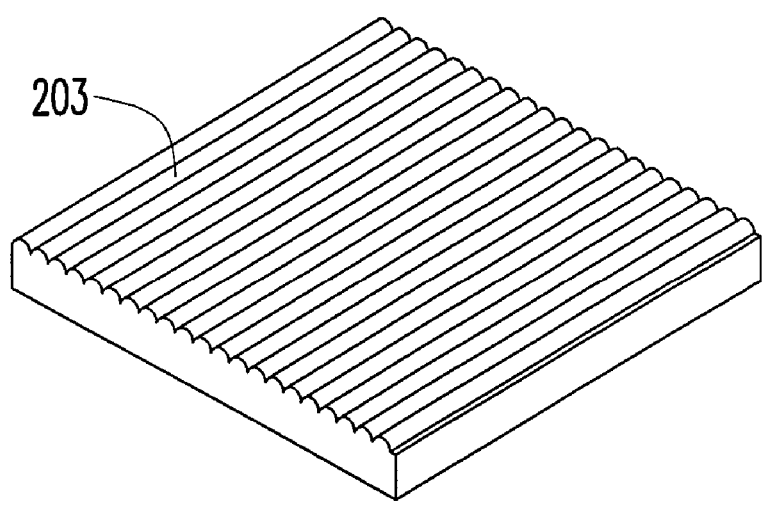
Figure 2D:
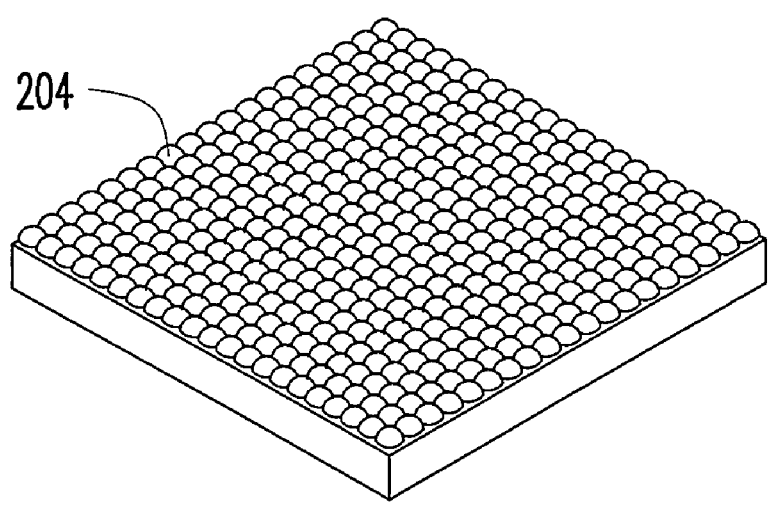
Figure 2E:
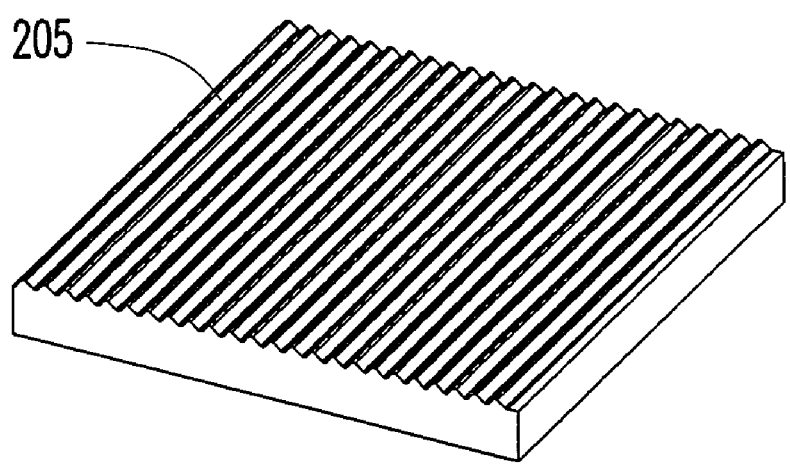
Figure 2F:
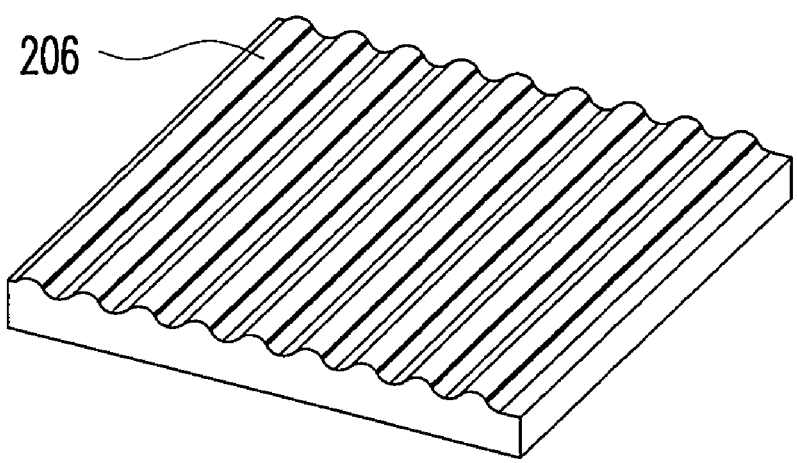

FIGS. 2A and 2B are schematic diagrams respectively illustrating unit patterns 201 and 202 with square profiles of a strip shape, a block shape or a trapezium shape. FIGS. 2C and 2D are schematic diagrams respectively illustrating unit patterns 203 and 204 with circular profiles of the strip shape and a round convex shape. FIG. 2E is a schematic diagram illustrating a unit pattern 205 with a triangle profile. FIG. 2F is a schematic diagram illustrating a unit pattern 206 with a wave-shape profile.

Next, referring to FIGS. 1A and 1B, a method for fabricating the transistor-type pressure sensor 100 is described below.

As shown in FIGS. 1A and 1B, the transistor-type pressure sensor 100 is fabricated between the lower substrate 110 and the upper substrate 170. First, the lower substrate 110 is provided, and the material of the lower substrate 110 can be glass, p-type (n-type) doped silicon wafer or polymer materials (such as polyethylene teraphthlalate (PET), polyimide (PI), etc.).

Next, the source 120 and the drain 130 are formed on the lower substrate 110. The material of the source and the drain can be metal (such as aluminium, titanium, nickel, copper, gold or chromium, etc.), metal particles, metal oxide (such as indium tin oxide or indium zinc oxide, etc.), conductive polymer (such as 3,4-polyethylenedioxythiophene-polystyrene-sulfonate (PEDOT:PSS) or polyaniline, etc.) or doped silicon material.

Next, the channel layer 140 is formed on the lower substrate 110, and is located between the source 120 and the drain 130. The channel layer 140 can be an organic or inorganic semiconductor material layer. For example, the inorganic semiconductor material can be Si or GaAs, while the organic semiconductor material can be semiconductor organic molecules (such as tetracene, pentancene or phthalocyanine), semiconductor polymer (such as polythiophene, polyfluorene, polyphenylenevinylene or derivatives thereof, such as poly (3-octyl)thiophene, poly [2-methoxy-5-(2'-ethyl-hexyloxy)-1,4-]phenylene vinylene) or oligomer (such as α-Sexithiophene).

Next, the dielectric layer 150 is formed on the lower substrate 110, the source 120, the drain 130 and the channel layer 140. The material of the dielectric layer 150 can be $SiO_2$, $Si_3N_4$, $TiO_2$, $Al_2O_3$, $HfO_2$, polyimide, polyvinyl pyrrolidone, polymethylmethacrylate, polyamide or parylene, etc.

Next, the upper substrate 170 is provided. The material of the upper substrate 170 can be flexible materials, plastic materials (such as polymeric materials (for example, polyethylene teraphthalate (PET), polyimide (PI) and poly dimethyl siloxane (PDMS)), etc.

The gate 160 with a required stepped surface profile is formed on a surface of the upper substrate 170, and the material of the gate can be the same as or different from that of the source/drain. A method for fabricating the stepped surface profile is described as follows. First, the stepped surface is formed on the surface of the soft substrate, and then electrodes are deposit on the soft substrate at the gate area. In another embodiment of the present invention, the stepped surface can be formed on the surface of the soft substrate, and then the electrodes are deposited on the soft substrate at the source/drain area.

In addition, the method for forming the stepped surface on the surface of the soft substrate can adapt the following manner. A surface of a silicon sheet etched with the required surface profile can be first cast with a shallow Polydimethylsiloxane (PDMS), and after heat curing, the PDMS is then stripped. As a result, the surface profile on the silicon sheet is transferred to the surface of the PDMS, so that the substrate with the stepped surface profile is formed.

Moreover, the substrate with the stepped surface profile can also be formed by depositing the soft and flexible materials on the substrate via different methods, for example, various photolithographic processes (such as electron-beam photolithographic process or optical photolithographic process), thermal evaporation, laser technique, inkjet process, screen printing and photolithography method, etc.

Next, variations of the aforementioned embodiment are described. Fabrication flows of the following variations have a little difference with that of FIGS. 1A and 1B. However, when considering the differences among structures, the fabrications can be implemented by adjusting the aforementioned fabrication steps.

Figure 3B:
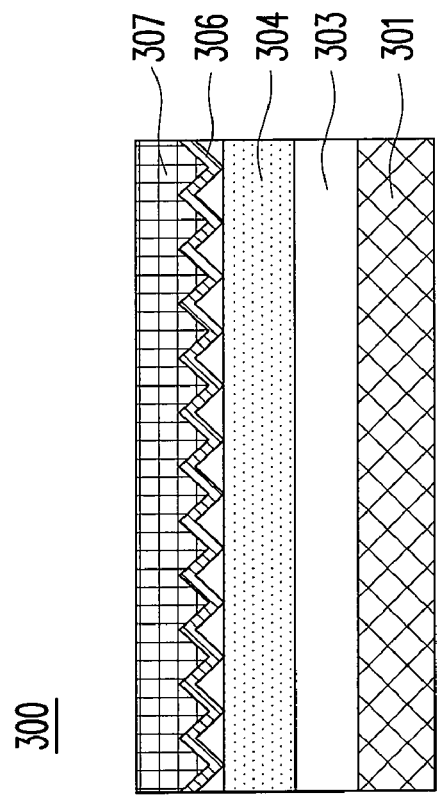
Figure 3A:
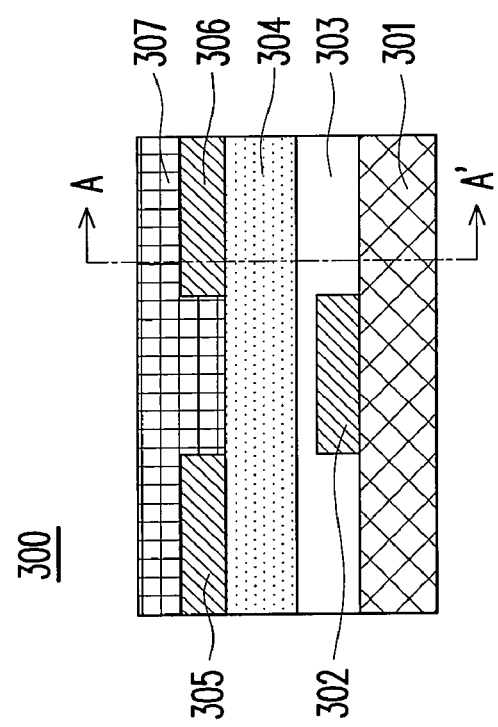

FIGS. 3A and 3B are structural diagrams illustrating a transistor-type pressure sensor according to another embodiment of the present invention, wherein FIG. 3B is a cross-sectional view of the transistor-type pressure sensor along a section line A-A' of FIG. 3A. The difference between FIGS. 3A and 3B and FIGS. 1A and 1B is that the gate is located on the lower substrate, and the source and the drain are located on the upper substrate. As shown in FIGS. 3A and 3B, the pressure sensor 300 comprises a lower substrate 301, a gate 302 formed on the lower substrate 301, a dielectric layer 303 disposed on the gate 302, a channel layer 304 disposed on the dielectric layer 303, a source 305 and a drain 306 forming electrodes 305 and 306 with the stepped surface profiles on a soft and flexible upper substrate 307, wherein the source 305 and the drain 306 are located apart from each other. Then, the soft upper substrate 307 having the source/drain 305 and 306 with the stepped surface profile is combined to the lower substrate 301 to form the transistor-type pressure sensor 300. Since the source 305 and the drain 306 have the stepped surface profile, the channel length/width ratio of the transistor is changed when the device thereof is deformed. Therefore, a current value of the transistor is changed for sensing a variation of the pressure, so as to form the transistor-type pressure sensor.

FIGS. 4A and 4B are structural diagrams illustrating a transistor-type pressure sensor according to another embodiment of the present invention, wherein FIG. 4B is a cross-sectional view of the transistor-type pressure sensor along a section line A-A' of FIG. 4A. The pressure sensor 310 of FIGS. 4A and 4B comprises a lower substrate 311, a source 312 and a drain 313 formed on the lower substrate 311 and located apart from each other, a channel layer 314 expanding between the source 312 and the drain 313, a gate 316 with the stepped surface profile formed on a soft and flexible upper substrate 317, and a dielectric layer 315 disposed on the gate 316. Then, the upper substrate 317 having the dielectric layer 315 and the gate 316 with the stepped surface profile is combined to the lower substrate 311 to form the field effect transistor-type pressure sensor 310.

Since the gate has the stepped surface profile, the channel length/width ratio of the transistor is changed when the device thereof is deformed. Therefore, the current value of the transistor is changed for sensing a variation of the pressure, so as to form the transistor-type pressure sensor.

Figure 5B:
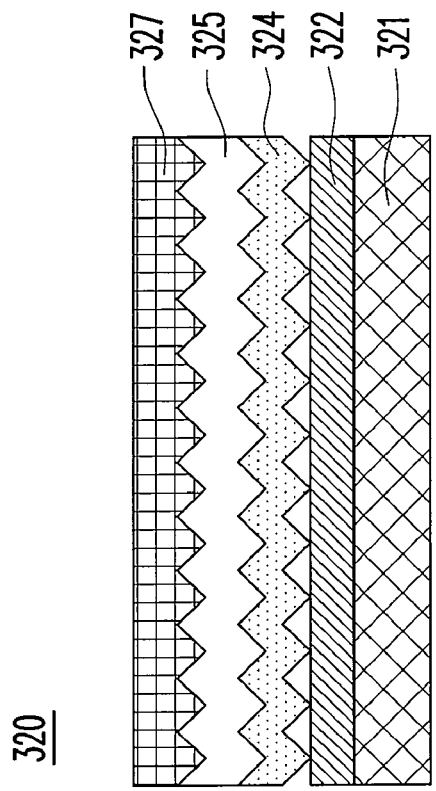
Figure 5A:
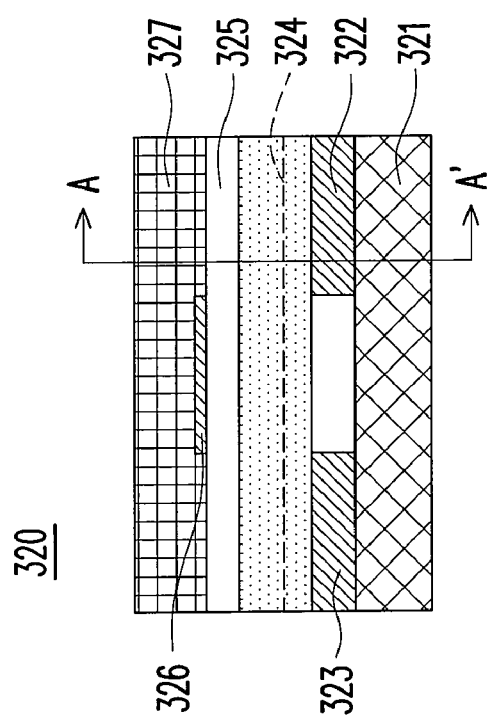

FIGS. 5A and 5B are structural diagrams illustrating a transistor-type pressure sensor according to another embodiment of the present invention, wherein FIG. 5B is a cross-sectional view of the transistor-type pressure sensor along a section line A-A' of FIG. 5A. The pressure sensor 320 of FIGS. 5A and 5B comprises a lower substrate 321, a source 322 and drain 323 formed on the lower substrate 321 and located apart from each other, a gate 326 with the stepped surface profile formed on a soft and flexible upper substrate 327, a dielectric layer 325 disposed on the gate 326, a channel layer 324 disposed on the dielectric layer 325. Then, the upper substrate 327 having the dielectric layer 325, the channel layer 324 and the gate 326 with the stepped surface profile is combined to the lower substrate 321 to form the field effect transistor-type pressure sensor 320.

Since the gate has the stepped surface profile, the channel length/width ratio of the transistor is changed when the device thereof is deformed. Therefore, the current value of the transistor is changed for sensing a variation of the pressure, so as to form the transistor-type pressure sensor.

Figure 6B:
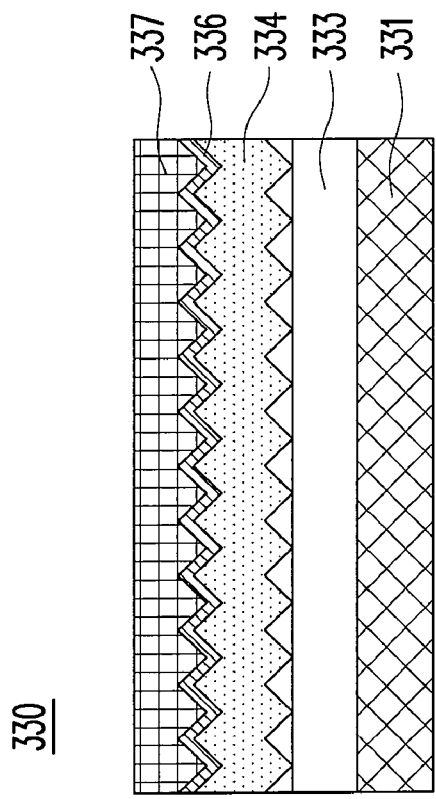
Figure 6A:
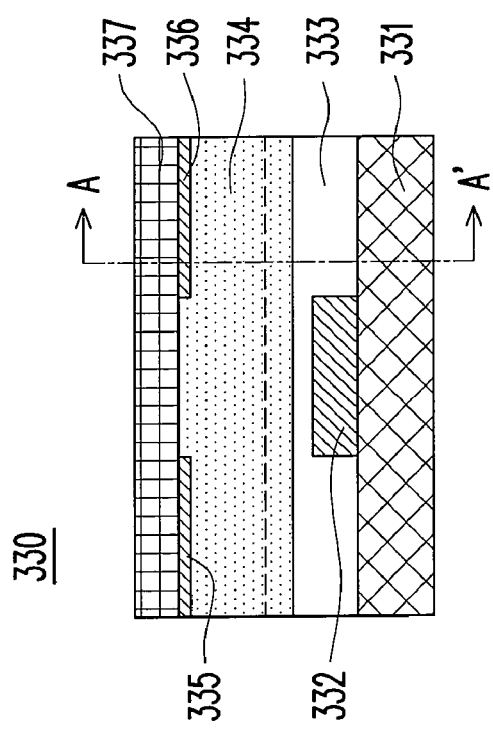

FIGS. 6A and 6B are structural diagrams illustrating a transistor-type pressure sensor according to another embodiment of the present invention, wherein FIG. 6B is a cross-sectional view of the transistor-type pressure sensor along a section line A-A' of FIG. 6A. The pressure sensor 330 of FIGS. 6A and 6B comprises a lower substrate 331, a gate 332 formed on the lower substrate 331, a dielectric layer 333 disposed on the gate 332, a source 335 and drain 336 forming electrodes 335 and 336 with the stepped surface profiles on a soft and flexible upper substrate 337, and being disposed apart from each other, a channel layer 334 expanding between the source 335 and the drain 336. Then, the soft substrate 337 having the channel layer 334 and the source/drain 335 and 336 with the stepped surface profile is combined to the lower substrate 331 to form the field effect transistor-type pressure sensor 330.

Since the source/drain have the stepped surface profile, the channel length/width ratio of the transistor is changed when the device thereof is deformed. Therefore, the current value of the transistor is changed for sensing a variation of the pressure, so as to form the transistor-type pressure sensor.

FIGS. 7A and 7B are structural diagrams illustrating a transistor-type pressure sensor according to another embodiment of the present invention, wherein FIG. 7B is a cross-sectional view of the transistor-type pressure sensor along a section line A-A' of FIG. 7A. The pressure sensor 340 of FIGS. 7A and 7B comprises a lower substrate 341, a gate 342 formed on the lower substrate 341, a source 345 and drain 346 forming electrodes 345 and 346 with the stepped surface profiles on a soft and flexible upper substrate 347, and being disposed apart from each other, a channel layer 344 expanding between the source 345 and the drain 346, a dielectric layer 343 disposed on the channel layer 344. Then, the soft substrate 347 having the channel layer 344, the dielectric layer 343 and the source/drain 345 and 346 with the stepped surface profile is combined to the lower substrate 341 to form the field effect transistor-type pressure sensor 340.

Since the source/drain have the stepped surface profile, the channel length/width ratio of the transistor is changed when the device thereof is deformed. Therefore, the current value of the transistor is changed for sensing a variation of the pressure, so as to form the transistor-type pressure sensor.

FIGS. 8A and 8B are structural diagrams illustrating a transistor-type pressure sensor according to another embodiment of the present invention, wherein FIG. 8B is a cross-sectional view of the transistor-type pressure sensor along a section line A-A' of FIG. 8A. The pressure sensor 350 of FIGS. 8A and 8B comprises a lower substrate 351, a gate 352 formed on the lower substrate 351, a dielectric layer 353 disposed on the gate 352, a channel layer 354 disposed on the dielectric layer 353, a source 355 and drain 356 forming electrodes 355 and 356 with the stepped surface profiles on a soft and flexible upper substrate 357, and being disposed apart from each other. Then, the soft substrate 357 having the source/drain 355 and 356 with the stepped surface profile is combined to the lower substrate 351 to form the field effect transistor-type pressure sensor 350.

Since the source/drain have the stepped surface profile, the channel length/width ratio of the transistor is changed when the device thereof is deformed. Therefore, the current value of the transistor is changed for sensing variation of the pressure, so as to form the transistor-type pressure sensor.

The aforementioned transistor-type pressure sensor can be a pressure sensor applied to a touch panel, and the touch panel can be applied to electronic products such as computers, personal digital assistances (PDAs), mobile phones, etc.

In summary, in the transistor-type pressure sensor of the present invention, electrodes with the stepped surface profiles are formed on the soft and flexible upper substrate, and then the upper substrate is combined to the lower substrate to form the transistor-type pressure sensor. In this way, the electrodes with the stepped surface profile can be deformed under the pressure applied to the surface of the device, so as to change the contact area of the channel, and accordingly the width/length ratio of the device is changed, and the current value of the device is further varied for sensing a variation of the pressure exerted on the surface of the device. Therefore, transistor-type pressure sensor of the present invention can be applied to thin-film transistors with various geometrical structures, and therefore the thin-film transistor of the present invention is not limited to the aforementioned type.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transistor-type pressure sensor, comprising:
   a lower substrate and an upper substrate;
   a transistor structure, having at least a gate, a source and a drain, and formed between the lower and the upper substrates;
   a channel layer, disposed at least between the source and the drain; and
   a dielectric layer, located on the source, the drain and the channel layer;
   wherein the source and the drain are located on the lower substrate and disposed apart from each other, and the gate is disposed between the upper substrate and the dielectric layer, and correspondingly located between the source and the drain approximately, and
   wherein a thin-film whose at least one layer including the gate, or the source and the drain has a stepped surface profile, and the stepped surface profile is capable of being deformed under a pressure applied to the pressure sensor, so as to change a width/length ratio of the channel layer.

2. The transistor-type pressure sensor as claimed in claim 1, wherein the dielectric layer further has the stepped surface profile.

3. The transistor-type pressure sensor as claimed in claim 1, wherein the channel layer further has the stepped surface profile.

4. A transistor-type pressure sensor, comprising:
   a lower substrate and an upper substrate;
   a transistor structure, having at least a gate, a source and a drain, and formed between the lower and the upper substrates;
   a dielectric layer, covering the lower substrate and the gate; and
   a channel layer, disposed on the dielectric layer and located between the source and the drain,
   wherein the source and the drain are formed on the upper substrate and disposed apart from each other, and the gate is disposed on the lower substrate and correspondingly located between the source and the drain approximately, and
   wherein a thin-film whose at least one layer including the gate, or the source and the drain has a stepped surface profile, and the stepped surface profile is capable of being deformed under a pressure applied to the pressure sensor, so as to change a width/length ratio of the channel layer.

5. The transistor-type pressure sensor as claimed in claim 4, wherein the dielectric layer further has the stepped surface profile.

6. The transistor-type pressure sensor as claimed in claim 4, wherein the channel layer further has the stepped surface profile.

7. The transistor-type pressure sensor as claimed in claim 1, wherein the stepped surface structure comprises a plurality of unit patterns with square shapes, triangle shapes, wave shapes, round shapes, trapezium shapes or cone shapes.

8. The transistor-type pressure sensor as claimed in claim 1, wherein the upper substrate is a flexible substrate.

9. The transistor-type pressure sensor as claimed in claim 1, wherein the transistor-type pressure sensor is a pressure sensor of a touch panel.

10. The transistor-type pressure sensor as claimed in claim 9, wherein the touch panel is applied to computers, personal digital assistances (PDAs) or mobile phones.

11. A method for fabricating a transistor-type pressure sensor, wherein the transistor comprises a gate, a source and a drain, and a dielectric layer and a channel layer sequentially disposed among the gate, the source and the drain, the method for fabricating the transistor-type pressure sensor comprising:
   providing an upper substrate and a lower substrate; and
   forming the transistor between the upper and the lower substrates, wherein the gate, or the source and the drain are formed with a stepped surface profile.

12. The method as claimed in claim 11, further comprising:
   forming the source and the drain on the lower substrate, wherein the source and the drain are located apart from each other;
   forming the gate on the upper substrate, wherein the gate is correspondingly located between the source and the drain approximately; and
   attaching the upper substrate having the gate to the lower substrate having the source and the drain to form the transistor-type pressure sensor.

13. The method as claimed in claim 12, further comprising forming the dielectric layer on the gate and the upper substrate after the stepped surface profile of the gate is formed, and forming the stepped surface profile on a surface of the dielectric layer.

14. The method as claimed in claim 13, further comprising forming the channel layer on the dielectric layer after the stepped surface profile of the dielectric layer is formed, and forming the stepped surface profile on the channel layer.

15. The method as claimed in claim 12, wherein forming the stepped surface profile further comprises:
   forming the stepped surface profile on a surface of the upper substrate; and
   forming an electrode layer on the upper substrate corresponding to the gate area.

16. The method as claimed in claim 11, further comprising:
   forming the source and the drain on the upper substrate, wherein the source and the drain are located apart from each other;
   forming the gate on the lower substrate, wherein the gate is correspondingly located between the source and the drain approximately; and
   attaching the lower substrate having the gate to the upper substrate having the source and the drain to form the transistor-type pressure sensor.

17. The method as claimed in claim 16, further comprising forming the channel layer on the source/drain and the upper substrate after the stepped surface profile of the gate is formed, and forming the stepped surface profile on a surface of the channel layer.

18. The method as claimed in claim 17, further comprising forming the dielectric layer on the channel layer after the stepped surface profile of the channel layer is formed, and forming the stepped surface profile on the dielectric layer.

19. The method for fabricating a transistor-type pressure sensor as claimed in claim 16, wherein forming the stepped surface profile further comprises:

forming the stepped surface profile on a surface of the upper substrate; and forming an electrode layer on the upper substrate corresponding to the source and the drain area.

20. The method as claimed in claim 11, wherein the stepped surface profile is formed by a photolithographic etching process.

21. The method as claimed in claim 11, wherein the stepped surface profile is formed by an inkjet technique, a laser technique, a thermal evaporation method, or a printing technique.

22. The method as claimed in claim 11, wherein the stepped surface profile is formed by arranging a plurality of unit patterns with square shapes, triangle shapes, wave shapes, round shapes, trapezium shapes or cone shapes.

23. The method as claimed in claim 11, wherein a material of the gate, the source and the drain is a conductive material.

24. The method as claimed in claim 23, wherein the conductive material comprises metal, metal particle, metal oxide, conductive polymer or doped silicon material.

25. The method as claimed in claim 11, wherein material of the dielectric layer comprises $SiO_2$, $Si_3N_4$, $TiO_2$, $Al_2O_3$, $HfO_2$, polyimide, polyvinyl pyrrolidone, polymethylmethacrylate, polyamide or parylene.

26. The method as claimed in claim 11, wherein a material of the channel layer comprises an inorganic semiconductor material or an organic semiconductor material.

27. The method as claimed in claim 26, wherein the organic semiconductor material comprises semiconductor organic molecules, semiconductor polymer or oligomer.

28. The method for fabricating a transistor-type pressure sensor as claimed in claim 11, wherein a material of the upper substrate is a flexible material.

* * * * *